US010591097B2

(12) United States Patent
Nahrwold et al.

(10) Patent No.: US 10,591,097 B2
(45) Date of Patent: Mar. 17, 2020

(54) FLANGE SEAL AND SEALING ARRANGEMENT COMPRISING A FLANGE SEAL OF THIS TYPE (71) Applicant: Carl Freudenberg KG, Weinheim (DE)

(72) Inventors: Olaf Nahrwold, Ludwigshafen (DE); Christian Geubert, Bensheim (DE); Frank Menzenhauer, Dortmund (DE); Peter Kritzer, Forst (DE); Frank Lauer, Rauenberg (DE)

(73) Assignee: CARL FREUDENBERG KG, Weinheim (DE)

(*) Notice: Subject to any disclaimer, the term of this patent is extended or adjusted under 35 U.S.C. 154(b) by 22 days.

(21) Appl. No.: 15/586,287

(22) Filed: May 4, 2017

(65) Prior Publication Data
US 2017/0321831 A1 Nov. 9, 2017

(30) Foreign Application Priority Data

May 4, 2016 (DE) .................. 10 2016 005 385

(51) Int. Cl.
F16L 23/22 (2006.01)
F16J 15/10 (2006.01)
F16J 15/06 (2006.01)
F16J 15/12 (2006.01)
F16L 23/18 (2006.01)

(52) U.S. Cl.
CPC ............ F16L 23/22 (2013.01); F16J 15/061 (2013.01); F16J 15/104 (2013.01); F16J 15/127 (2013.01); F16L 23/18 (2013.01)

(58) Field of Classification Search
CPC ......... F16L 23/22; F16J 15/104; F16J 15/024; F16J 15/127
See application file for complete search history.

(56) References Cited

U.S. PATENT DOCUMENTS

| 3,278,673 A | * | 10/1966 | Gore ................... B29C 47/0004 156/51 |
| 3,355,181 A | | 11/1967 | Olson |
| 3,524,662 A | * | 8/1970 | Hudson, Jr. ......... F16L 23/0286 285/368 |
| 3,524,794 A | * | 8/1970 | Jonnes ............... B29D 99/0053 277/650 |
| 3,635,480 A | | 1/1972 | Bain et al. |
| 3,690,684 A | * | 9/1972 | Lansaque ............... F16J 15/024 277/615 |

(Continued)

FOREIGN PATENT DOCUMENTS

| DE | 2126740 A1 | 12/1971 |
| DE | 3720224 A1 * | 1/1989 ............. F16J 15/127 |

(Continued)

Primary Examiner — Eugene G Byrd
(74) Attorney, Agent, or Firm — Leydig, Voit & Mayer, Ltd.

(57) ABSTRACT

A flange seal has a support body of a tough, hard material, and a sealing element of a rubbery-elastic material, that are interconnected in a single piece, the sealing element having a sealing edge that can be exposed to a medium to be sealed in a chamber to be sealed. In the state resulting from manufacture, the sealing element has cavities in the region of the sealing edge, which cavities vary in volume during use of the flange seal as intended.

16 Claims, 13 Drawing Sheets

(56) References Cited

U.S. PATENT DOCUMENTS

| | | | | |
|---|---|---|---|---|
| 3,902,937 | A | * | 9/1975 | Arndt ............... B29C 70/66 156/315 |
| 3,918,726 | A | * | 11/1975 | Kramer ............. F16J 15/166 277/651 |
| 4,013,810 | A | * | 3/1977 | Long ............... B29C 70/025 428/313.9 |
| 4,026,565 | A | | 5/1977 | Jelinek |
| 4,072,316 | A | * | 2/1978 | Decker ............. F02M 19/00 277/597 |
| 4,961,891 | A | * | 10/1990 | Pitolaj ............. B29C 67/04 264/112 |
| 5,082,725 | A | | 1/1992 | Saito et al. |
| 5,257,834 | A | * | 11/1993 | Zeidler ............. F16L 17/06 285/328 |
| 5,975,539 | A | * | 11/1999 | Ueda ............... F16J 15/123 277/593 |
| 6,267,414 | B1 | * | 7/2001 | Mosse ............. F16L 15/008 277/603 |
| 6,337,127 | B1 | * | 1/2002 | Voss ............... B60R 13/02 428/317.1 |
| 2005/0212291 | A1 | * | 9/2005 | Edwards ........... F16L 23/10 285/364 |
| 2006/0012070 | A1 | * | 1/2006 | Fontecchio ........ B32B 5/18 264/171.13 |
| 2008/0093844 | A1 | * | 4/2008 | Casey, Sr. ......... F16L 23/10 285/135.2 |
| 2008/0106044 | A1 | * | 5/2008 | Luong ............. F16J 15/024 277/593 |
| 2008/0111321 | A1 | | 5/2008 | Okumura et al. |
| 2010/0253009 | A1 | * | 10/2010 | Yoshitomi ......... F16L 23/10 277/608 |
| 2011/0042905 | A1 | * | 2/2011 | Schroder ........... F16L 23/22 277/614 |
| 2011/0140374 | A1 | | 6/2011 | Dubiel |

FOREIGN PATENT DOCUMENTS

| | | |
|---|---|---|
| EP | 1136734 A1 | 9/2001 |
| EP | 2334959 B1 | 6/2011 |
| JP | S50140008 A | 11/1975 |
| JP | H03229069 A | 10/1991 |
| JP | H09303564 A | 11/1997 |
| WO | WO 0114779 A1 | 3/2001 |
| WO | WO 2006008856 A | 1/2006 |

* cited by examiner

FLANGE SEAL AND SEALING ARRANGEMENT COMPRISING A FLANGE SEAL OF THIS TYPE

CROSS-REFERENCE TO RELATED APPLICATIONS

Priority is claimed to German Patent Application No. DE 10 2016 005 385.2, filed on May 4, 2016, the entire disclosure of which is hereby incorporated by reference herein.

FIELD

The invention relates to a flange seal and to a sealing arrangement comprising a flange seal of this type.

BACKGROUND

A flange seal of this type and a sealing arrangement of this type are each known from DIN 32676.

The sealing arrangement comprises two flanges that are arranged mutually coaxially and axially adjacent and are interconnected in a sealing manner by a flange seal that is clamped in the axial direction.

The flanges and the flange seal together form a tubular line, through which a medium to be sealed can flow.

On the mutually facing faces thereof, the flanges each comprise a groove, thickenings of the sealing element of the flange seal being arranged in the grooves in a sealing manner.

On the radially inner face, the flange seal comprises a sealing edge, the internal diameter of which corresponds to the diameter of the tubular line.

EP 2 334 959 B1 discloses a flange seal for sealing a hygienic tube.

The flange seal comprises an annular support body comprising an inner periphery and an outer periphery and two end faces that are covered at least in part by the elastomer material of the sealing element. Only the axial end stops arranged on the end faces on both sides, which each form a component of the support body, are not covered.

The support body has an internal diameter that is slightly larger than the internal diameter of the flanges, the inner circumferential face of the support body, viewed in the cross section of the sealing arrangement, being enclosed substantially in a U-shape by the rubbery-elastic material of the sealing element. When the flange seal is assembled, it has an internal diameter corresponding to the internal diameter of the flanges.

In the above-described prior art, thermal expansion and/or swelling would lead to the rubbery-elastic material of the sealing element expanding/swelling radially inwards, entirely in the radial direction, even to such an extent that the sealing edge of the sealing element protrudes radially inwards into the cavity delimited by the flanges. As a result, the flow cross section for the medium to be sealed is undesirably constricted by the flanges, and undesirable eddies in the medium to be sealed may occur.

A further drawback is that the sealing edge may be sheared off for example when cleaning the flange, mechanical particles may be released as a result, and the sealing edge may no longer seal reliably as a result of damage of this type.

SUMMARY

An aspect of the invention provides a flange seal, comprising: a support body including a tough, hard material; and a sealing element including a rubbery-elastic material, wherein the support body and the sealing element are interconnected in a single piece, wherein the sealing element includes a sealing edge configured to be exposed to a medium to be sealed in a chamber to be sealed, wherein, in a state resulting from manufacture, the sealing element includes first cavities in a sealing edge region, which cavities vary in volume during use of the flange seal as intended.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 two different embodiments of cavities, the cavities being shown in the state resulting from manufacture in FIGS. 4.1.1 and 4.2.1, and in the installed state at room temperature without being exposed to an aggressive medium in FIGS. 4.1.2 and 4.2.2, and under maximum exposure, in other words being exposed to high temperatures and an aggressive medium to be sealed, in FIGS. 4.1.3 and 4.2.3;

DETAILED DESCRIPTION

An aspect of the invention provides a flange seal comprising a support body, consisting of a tough, hard material, and a sealing element, consisting of a rubbery-elastic material, that are interconnected in a single piece, the sealing element having a sealing edge that can be exposed to a medium to be sealed in a chamber to be sealed.

An aspect of the invention provides a sealing arrangement comprising a flange seal of this type and two flanges, the flange seal being arranged between the flanges in a sealing manner in the axial direction.

An aspect of the invention is to disclose a flange seal and a sealing arrangement comprising the flange seal in which, under all operating conditions, the internal diameter of the flange seal, in particular the diameter of the sealing edge, is only very slightly smaller, if at all smaller, than the internal diameter of the flanges to be sealed.

To achieve an aspect of the invention, it is provided that, in the state resulting from manufacture, the sealing element has cavities in the region of the sealing edge which vary in volume during use of the flange seal as intended.

During use as intended, a flange seal is usually exposed to different temperatures, and comes into contact with different media to be sealed. Exposure to different temperatures and/or different media to be sealed can lead to thermal expansion of the sealing element and/or to swelling of the material of the sealing element during use of the flange seal as intended.

To overcome the aforementioned drawbacks, the cavities are provided in the region of the sealing edge and vary in volume during use of the flange seal as intended.

Conventionally, when rubber parts are produced great care is taken that they do not have any, normally disadvantageous, cavities.

According to the invention, however, it has been found that, in connection with flange seals, cavities that vary in volume lead to advantageous use properties of the flange seal, since these cavities compensate thermal expansions of the rubbery-elastic material of the sealing element and/or swellings of this material. The compensation takes place in that the expanded/swollen material is received in the cavities and as a result the internal diameter of the sealing element, in particular the internal diameter of the sealing edge, always remains largely constant and virtually does not protrude into the internal diameter of the flanges.

Flanges and flange seals are cleaned particularly frequently in "hygienic operation", in other words in the field of foods or pharmaceuticals, a fitting in which the flange seal is used being cleaned at temperatures of from approximately 130° C. to 160° C. Chemically aggressive cleaning agents are often used as cleaning agents, and can lead to undesirable swelling of the rubbery-elastic material of the sealing element that cannot be prevented by technical means.

Because the expansion, due to temperature, and/or swelling, for example resulting from chemically aggressive cleaning agents, are compensated by the cavities, the sealing arrangement can be cleaned mechanically by brushes or scrapers without problems, without the sealing element being damaged, for example without the sealing edge on the axially adjacent delimiting edges of the flanges being sheared off.

Within the meaning of the invention, the phrase "in the region of the sealing edge" refers to the region that can advantageously influence the use properties of the flange seal under the above-described conditions. The rubbery-elastic material in the region of the sealing edges retracts into the cavities under the above-described conditions.

An advantageous embodiment provides that the cavities are formed intrinsically closed. This has the advantage that these cavities are hermetically sealed from the outside, and therefore they are not contaminated for example by medium to be sealed and the use properties thereof are thus not negatively influenced. The flange seal thus has constantly good use properties throughout the operational life.

As stated above, the cavities are formed as volume compensation cavities for receiving rubbery-elastic material of the sealing element during use of the flange seal as intended as a result of thermal expansion and/or swelling of the rubbery-elastic material.

In addition to the above-described cavities in the region of the sealing edge, further cavities may be arranged in the sealing element. The purpose of these further cavities is that the rubbery-elastic material of the sealing element can expand largely homogeneously in the entire flange seal and thus no undesirable internal stresses occur in the rubbery-elastic material.

For this purpose, it may advantageously be provided that the cavities and the further cavities are substantially uniformly distributed in the sealing element.

Viewed in the flow direction of the medium to be sealed in the space to be sealed, the sealing edge may be concave. If the cavities are already filled as a result of the expansion, due to temperature, and/or swelling of the rubbery-elastic material, the sealing edge, which is initially still concave as a result of manufacture, can continue to extend toward being convex until the sealing edge terminates flush with the internal diameter of the flanges.

The sealing element may consist of EPDM material. This has the advantage that a material of this type is particularly cost-effective and simple to process. For example, FKM, VMQ, NBR or ACM may be used as materials.

If the cavities according to the invention were not used, an EPDM material of this type would be unsuitable for flange seals in practice. A material of this type reacts to different temperatures and/or different media to be sealed with large changes in the expansion thereof and/or with in some cases considerable swelling. It is only because the material can retract into the cavities that it has sufficient service lives and sufficiently good use properties for sealing flanges.

The support body may comprise axial end stops on the end faces on both sides for limiting clamping forces acting on the flange seal, the support body, with the exception of the end stops, being substantially enclosed by rubbery-elastic material of the sealing element. The flange seal is clamped in the axial direction during the assembly thereof until the axial end stops are touched by the flanges in a directly contacting manner. This has the advantage that, as a result of the clamping forces being limited, the rubbery-elastic material of the sealing element is not exposed to any undesirably high mechanical loads. The end stops thus have the function of limiting clamping force.

The support body and the sealing element are preferably interconnected in an integrally bonded manner and/or positive fit. This may be provided either by chemical bonding or by sufficiently good interlocking. In particular with respect to a good positive connection, it is expedient for the rubbery-elastic material of the sealing element to enclose the support body virtually completely, as described above.

The support body may be undulating or in the shape of a chain of beads, viewed in the circumferential direction thereof. Support bodies shaped in this manner have the advantage that they only take up a comparatively small volume in the flange seal overall, and thus sufficient volume is still available to compensate thermal expansion and/or swelling of the rubbery-elastic material of the sealing element.

If a support body in the form of a chain of beads is used, the beads may be circular or trapezoidal, as viewed in cross section. For beads that are circular in cross section, it is advantageous that for increasing compression the contact area of the beads, which are flattened in this case, becomes larger and larger. Further, the ball shape of the beads has a very high stability, and makes possible uniform dissipation of introduced forces in all directions.

For beads that are trapezoidal in cross section, it is advantageous that the introduced forces are only dissipated laterally. The trapezoid shape results in a larger contact region, and therefore higher forces can be absorbed. Furthermore, the trapezoid shape is simpler than a ball shape and can thus be manufactured more cost-effectively.

The flange seal is preferably delimited at the outer periphery by the support body encased by the rubbery-elastic material. As a result of the support body only being arranged in the radially outer region of the flange seal, the sealing element can be particularly well adapted to the specific circumstances of the application.

This results in better cooperation between the elastomer material and the support body.

Radially internally, the elastomer can seal without interference, and radially externally, the support body can be very effective and protects the elastomer from excessive forces.

It is furthermore advantageous that the thermal load is smaller radially externally and this results in a better supporting effect.

The seal arrangement comprises a flange seal as disclosed above and two flanges, the flange seal being arranged between the flanges in a sealing manner in the axial direction and the flanges touching the end stops in a directly contacting manner.

Figure 1:
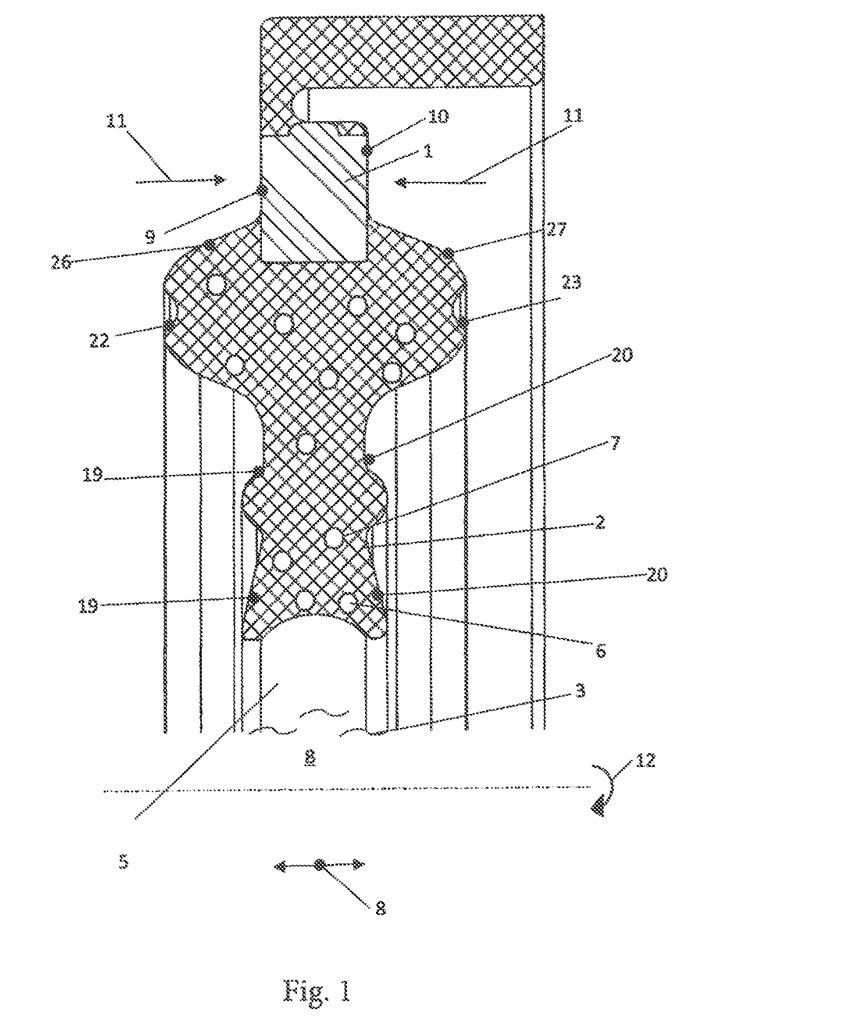
FIG. 1 an embodiment of the flange seal according to the invention.

FIG. 1 shows an embodiment of a flange seal comprising a support body 1 of a tough, hard material. The sealing element 2 consists of a rubbery-elastic material and is connected to the support body 1 in a single piece.

Radially internally, the sealing element 2 has the sealing edge 5, which can be exposed to medium 3 to be sealed in a chamber 4 to be sealed.

What is essential to the invention is that in the state resulting from manufacture, as shown here, the sealing element 2 has cavities 6 in the region of the sealing edge 5, which cavities vary in volume during use of the flange seal as intended.

In this context, reference is made in advance to FIG. 4, which shows the cavities 6 that vary in volume.

In the embodiment shown here, the cavities 6 are formed intrinsically closed, in addition to the notches 19, 20, which may be referred to as open cavities and which are arranged on the end faces on both sides of the sealing element 2 in the axial direction 18. The cavities 6 shown here are formed as volume compensation cavities, and are provided for receiving, during use of the flange seal as intended, rubbery-elastic material of the sealing element 2 as a result of thermal expansion and/or swelling of the rubbery-elastic material. As well as the above-disclosed cavities 6, further cavities 7 are provided, and are substantially uniformly distributed in the sealing element 2. As a result, stress peaks within the elastomer material of the sealing element 2 are prevented.

Viewed in the flow direction 8 of the medium 3 to be sealed in the chamber 4 to be sealed, the sealing edge 5 is concave.

The support body 1 comprises end stops 9, 10 on the end faces on both sides for limiting the clamping forces 11 acting on the flange seal, the support body 1, with the exception of the end stops 9, 10, being fully enclosed by the rubbery-elastic material of the sealing element. The support body 1 shown here and the sealing element 2 are interconnected in an integrally bonded manner and positive fit, and the support body 1 is undulating 13, viewed in the circumferential direction 12 thereof.

The sealing element comprises bulges 26, 27 on the end faces on both sides, radially externally in the region of the support body 1, in each of which bulges a notch 22, 23, preferably extending in the circumferential direction, is arranged. When the flange seal is axially compressed, displaced elastomer material of the sealing element 2 can shift into these notches 22, 23. This assists the function of the cavities 6 and/or the further cavities 7.

Figure 2:
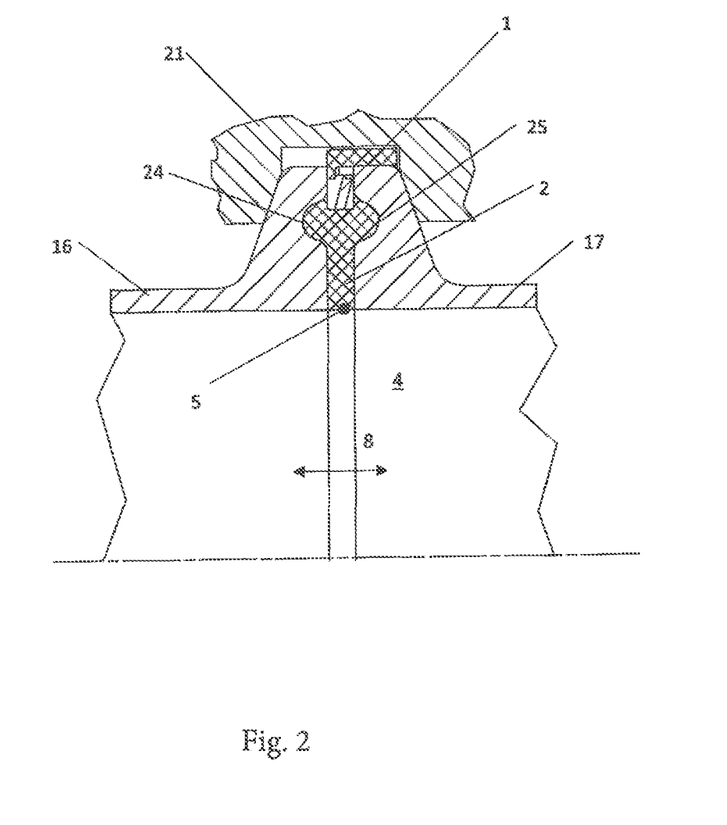
FIG. 2 a seal arrangement comprising the flange seal of FIG. 1.

FIG. 2 shows the flange seal of FIG. 1 installed in a sealing arrangement. The flange seal is arranged between the two flanges 16, 17 in a sealing manner in the axial direction 18, the two flanges 16, 17 being touched in a directly contacting manner by the end stops 9, 10 of the support body 1. The section extends along the line A-A of FIG. 5.

Figure 3:
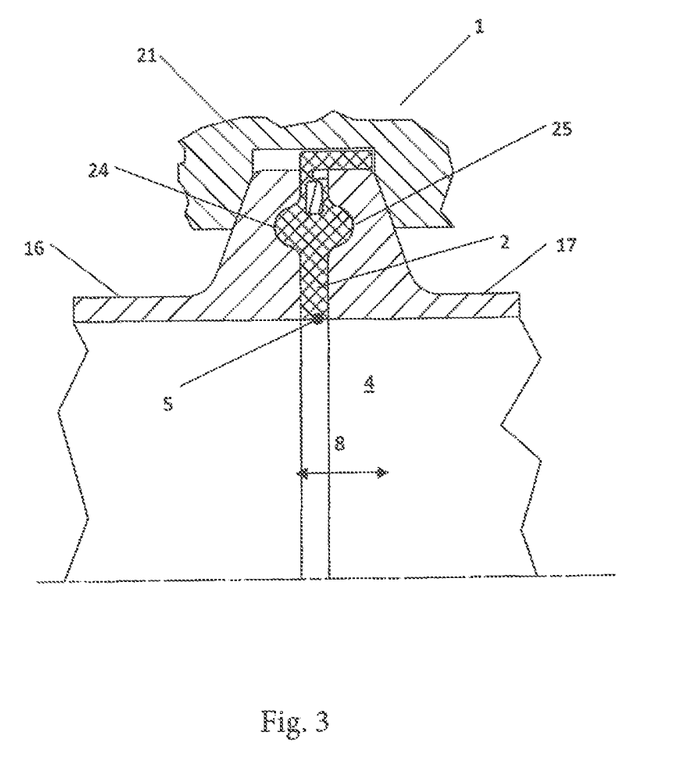
FIG. 3 the seal arrangement of FIG. 2, sectioned in a different location.

FIG. 3 shows the sealing arrangement of FIG. 2, but sectioned in a different location. The section is along the line B-B of FIG. 5. Here, it can be seen that the support body 1 is fully enclosed by the rubbery-elastic material of the sealing element in this location.

In FIGS. 2 and 3, a clamp 21 is provided for the flanges 16, 17, and holds them together in the axial direction. The flanges 16, 17 comprise grooves 24, 25, in which the bulges 26, 27 are received during use of the sealing arrangement as intended.

FIG. 4 shows different exposure states of the sealing element 2 in the region of the sealing edge 5.

FIGS. 4.1.1 and 4.2.1 show cavities 6 in the state resulting from manufacture.

FIG. 4.1.1 shows one comparatively large cavity, whilst FIG. 4.2.1 shows five smaller cavities.

FIGS. 4.1.2 and 4.2.2 show the rubbery-elastic material of the sealing element 2 of the flange seal in the installed state. Some of the displaced material has already shifted into the cavities 6, which are now smaller.

FIGS. 4.1.3 and 4.2.3 show the maximum exposure state of the material of the sealing element 2 in the region of the sealing edge 5. A majority of the material has shifted into the cavities 6, 7, and so the cavities 6, 7 are now almost completely filled with material displaced as a result of temperature or swollen as a result of the medium.

What is of decisive importance is that, when exposed to temperature and/or during swelling, the rubbery-elastic material of the sealing element 2 is displaced into the cavities 6, 7, and so the sealing element takes on substantially the same shape in all exposure states, in particular in the region of the sealing edge 5. There is no undesirable extrusion of the material from the sealing gap between the two flanges 16, 17 in the tubular cross section delimited by the flanges 16, 17.

Figure 5:
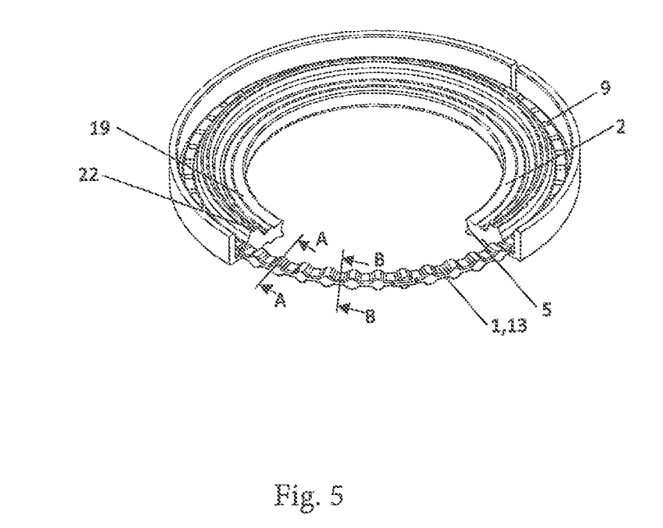
FIG. 5 a perspective view of the flange seal of FIG. 1.

FIG. 5 is a perspective view of the flange seal of FIG. 1, part of the support body 1 being revealed for improved clarity.

Figure 6:
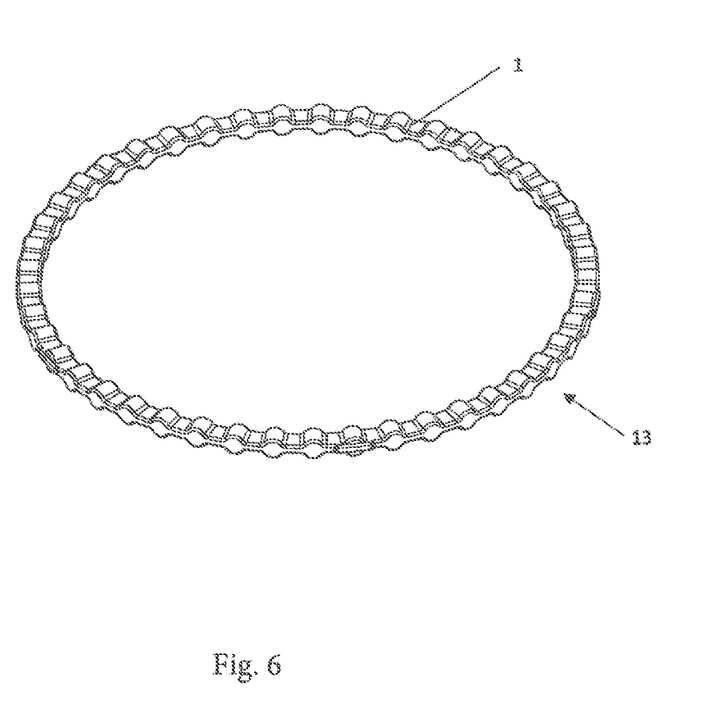
FIG. 6 a perspective view of the support body of FIG. 5.

FIG. 6 shows the support body 1 of FIG. 5 as an individual part. The support body 1 is undulating 13, viewed in the circumferential direction 12.

Figure 7:
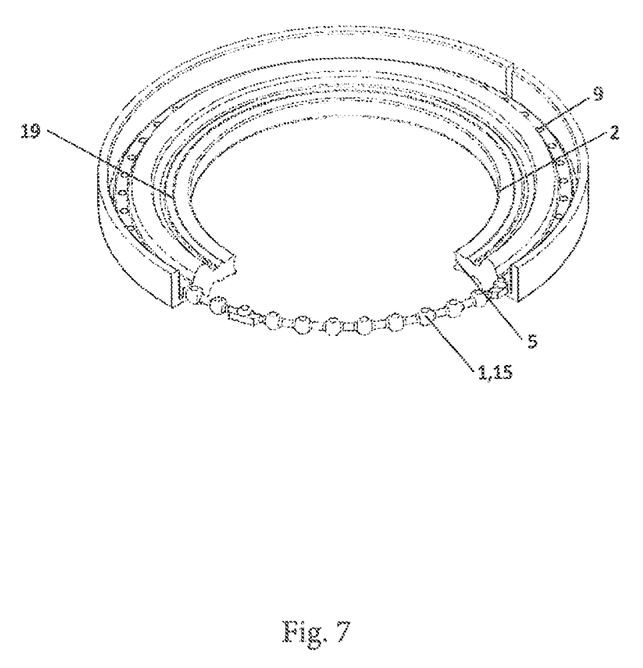
FIG. 7 a second embodiment of a support body, similar to the support body of FIG. 5.
Figure 8:
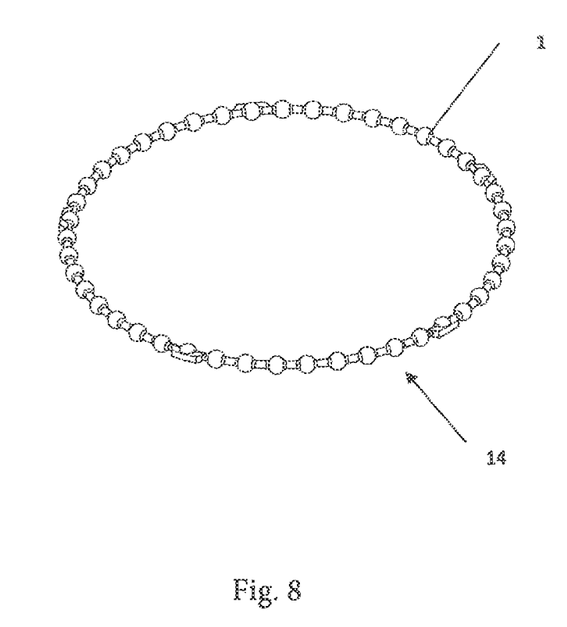
FIG. 8 a support body in the form of a chain of beads.

FIG. 7 shows a flange seal similar to the flange seal of FIG. 5. The sole difference is that the support body 1 is formed differently. The support body 1 is in the form of a chain of beads 14, viewed in the circumferential direction 12, the beads 15 of the support body 1, 14 in the form of a chain of beads being circular, viewed in cross section. The beads 15 have flattened end stops 9, 10.

Figure 9:
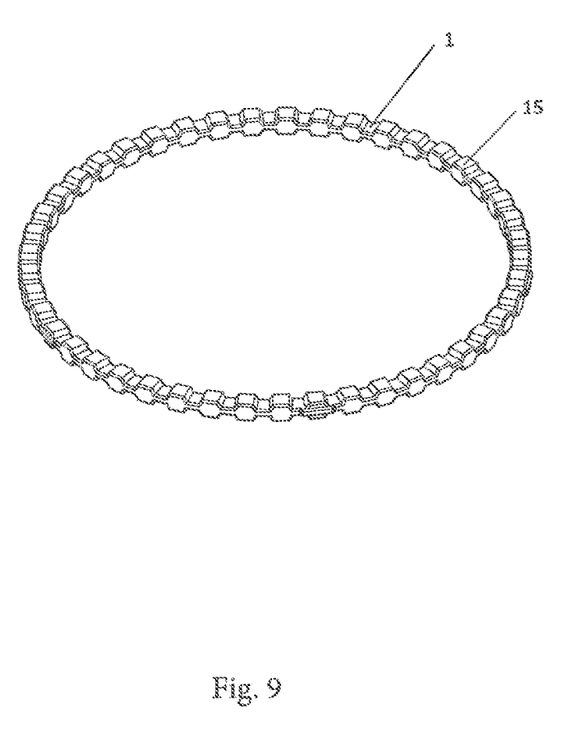
FIG. 9 a further embodiment of a support body comprising trapezoidal beads.

FIG. 9 shows a further support body, the support body of FIG. 9 comprising trapezoidal beads 15. This shape makes it possible to absorb very high clamping forces 11.

Figure 10:
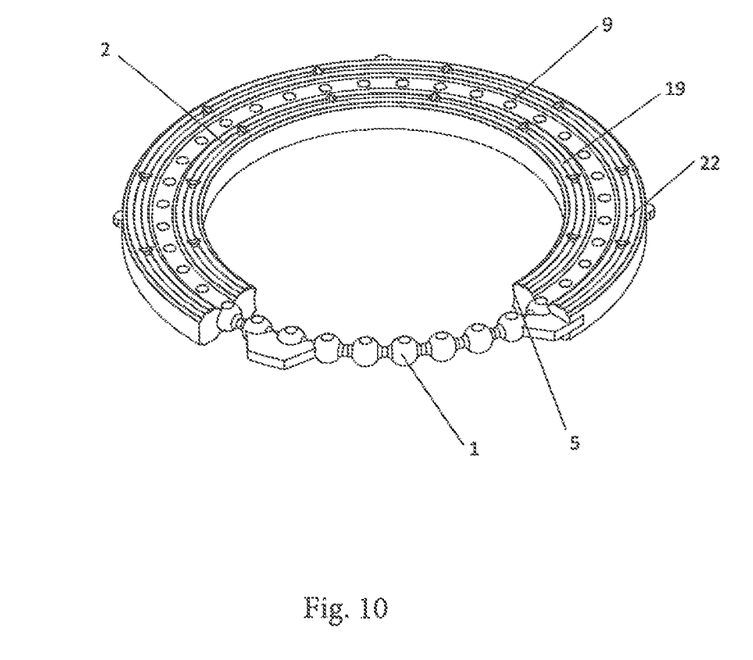
FIG. 10 an embodiment of the flange seal according to the invention as a flange seal.

FIG. 10 shows a flange seal similar to the flange seal of FIG. 5, the flange seal shown in FIG. 10 being formed as a flat seal. By contrast with the flange seal of FIG. 1, the flat seal has no bulges, and accordingly the flanges used have no grooves such as those shown in FIGS. 2 and 3.

Figure 11:
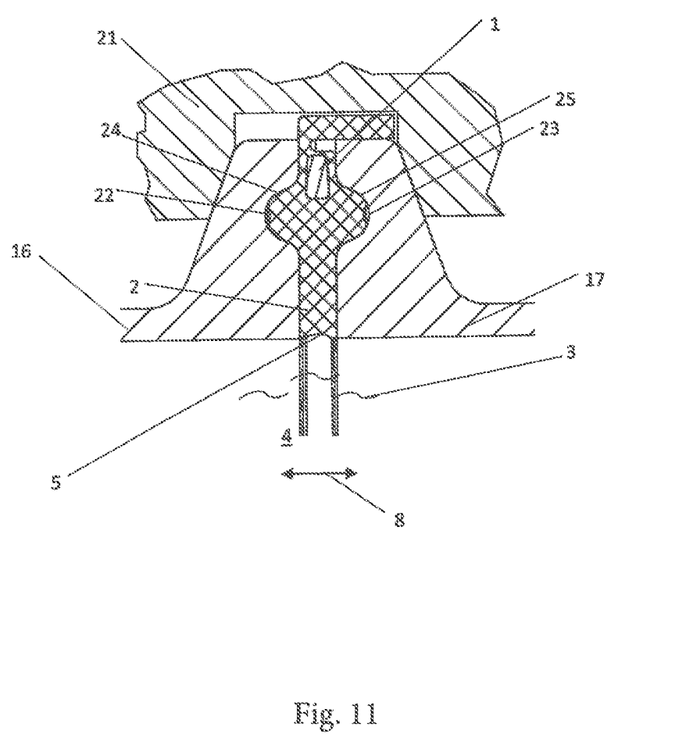
FIG. 11 the embodiment of FIG. 3 at room temperature.
Figure 12:
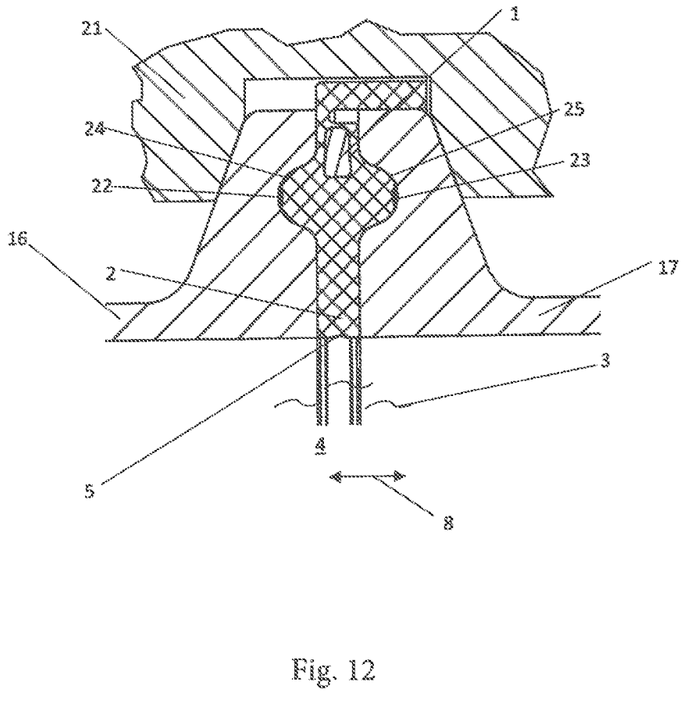
FIG. 12 the embodiment of FIG. 3 at 80° C.
Figure 13:
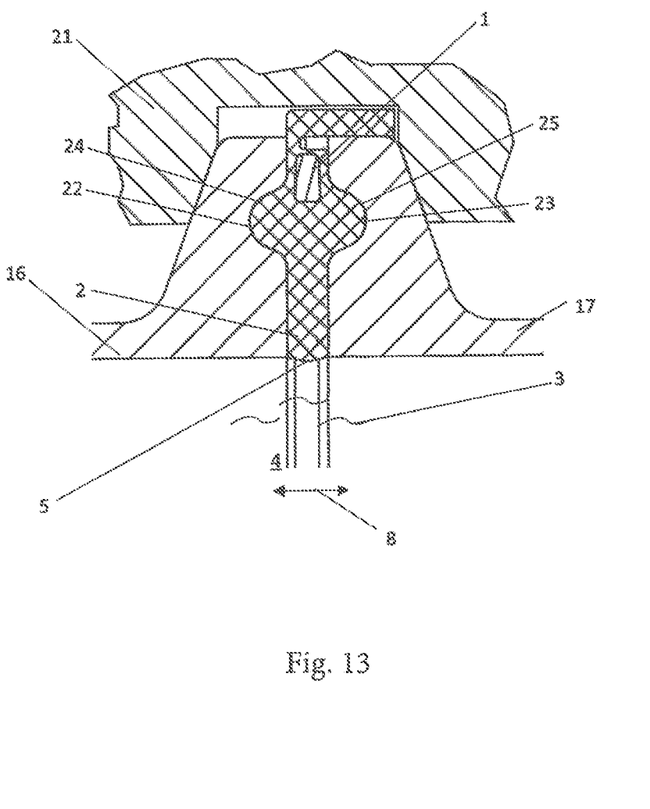
FIG. 13 the embodiment of FIG. 3 at 160° C.
Figure 41:
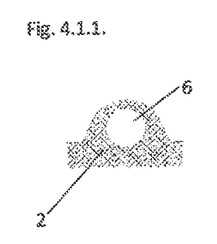
Figure 42:
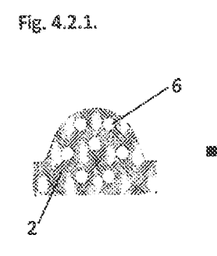

FIGS. 11 to 13 show the sealing arrangement of FIGS. 2 and 3 in different operating states.

The sealing arrangement can be seen at room temperature in FIG. 11, at 80° C. in FIG. 12 and at 160° C. in FIG. 13. It can clearly be seen that the different temperature exposures and/or exposing the rubbery-elastic material of the sealing element 2 to aggressive media 3 have virtually no effect on the shape of the sealing edge 5 of the sealing element 2, since the expanded and/or swollen rubbery-elastic material of the sealing element retracts into the cavities 6, 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A flange seal, comprising:
   a support body including a tough, hard material; and
   a sealing element including a rubbery-elastic material,
   wherein the support body and the sealing element are interconnected in a single piece,
   wherein the sealing element includes a sealing edge configured to be exposed to a medium to be sealed in a chamber to be sealed,
   wherein, in a state resulting from manufacture, the sealing element includes first cavities in a sealing edge region, which cavities vary in volume during use of the flange seal as intended, and
   wherein the support body is undulating, viewed in a circumferential direction thereof.

2. The seal of claim 1, wherein the first cavities are formed intrinsically closed.

3. The seal of claim 1, wherein the first cavities are volume compensation cavities configured to receive the rubbery-elastic material of the sealing element during use of the flange seal as intended as a result of thermal expansion and/or swelling of the rubbery-elastic material.

4. The seal of claim 1, further comprising:
   second cavities arranged in the sealing element.

5. The seal of claim 4, wherein the first cavities and the second cavities are substantially uniformly distributed in the sealing element.

6. The seal of claim 1, wherein the sealing edge is concave, viewed in a flow direction of the medium to be sealed in the chamber to be sealed.

7. The seal of claim 1, wherein the sealing element includes an EPDM material.

8. The seal of claim 1, wherein the sealing element consists essentially of an EPDM material.

9. The seal of claim 1, wherein the support body includes a first and a second axial end stop on end faces on both sides configured to limit clamping forces acting on the flange seal, and
   wherein the support body, except the end stops, is substantially fully enclosed by the rubbery-elastic material of the sealing element.

10. The seal of claim 1, wherein the support body and the sealing element are interconnected in an integrally bonded manner.

11. The seal of claim 1, wherein the support body and the sealing element are interconnected in a positive fit.

12. The seal of claim 1, wherein the support body and the sealing element are interconnected in an integrally bonded manner and positive fit.

13. The seal of claim 1, wherein the support body is in a shape of a chain of beads, viewed in the circumferential direction thereof.

14. The seal according to claim 13, wherein the beads are circular, viewed in cross section.

15. The seal according to claim 13, wherein the beads are trapezoidal, viewed in cross section.

16. A sealing arrangement, comprising:
   the flange seal of claim 1; and
   a first and a second flange,
   wherein the flange seal is arranged between the flanges in a sealing manner in an axial direction and the flanges touch end stops in a directly contacting manner.

* * * * *